United States Patent [19]
Atwell et al.

US005216059A

[11] Patent Number: 5,216,059
[45] Date of Patent: Jun. 1, 1993

[54] FLAME RETARDANT ADDITIVE COMPOSITION USEFUL WITH POLYOLEFINS

[75] Inventors: Ray W. Atwell; William R. Fielding, both of West Lafayette; Harry A. Hodgen, Battle Ground; Nicolai A. Favstritsky, Lafayette, all of Ind.

[73] Assignee: Great Lakes Chemical Corp., W. Lafayette, Ind.

[21] Appl. No.: 867,991

[22] Filed: Apr. 13, 1992

[51] Int. Cl.⁵ .............................. C08K 5/13; C08K 5/06
[52] U.S. Cl. ..................................... 524/376; 525/288; 524/567; 524/410; 524/411
[58] Field of Search .................. 525/76, 288; 524/373, 524/567, 410, 411, 412

[56] References Cited

U.S. PATENT DOCUMENTS

| | | | |
|---|---|---|---|
| 3,177,270 | 4/1965 | Jones et al. | 525/285 |
| 3,331,797 | 7/1967 | Kopetz et al. | 260/28.5 |
| 3,883,481 | 5/1975 | Kopetz et al. | 260/45.75 B |
| 4,532,287 | 7/1985 | Bill et al. | 524/373 |
| 4,780,496 | 10/1988 | Termine et al. | 524/373 |
| 4,966,946 | 10/1990 | Favstritsky et al. | 525/288 |
| 5,041,484 | 8/1991 | Atwell et al. | 525/288 |
| 5,077,337 | 12/1991 | Atwell et al. | 525/288 |

FOREIGN PATENT DOCUMENTS

| | | |
|---|---|---|
| 2055427 | 5/1972 | Fed. Rep. of Germany . |
| 50-23064 | 8/1975 | Japan . |
| 57-39216 | 3/1982 | Japan . |
| 57-73032 | 5/1982 | Japan . |
| 57-158247 | 9/1982 | Japan . |
| 61-168643 | 7/1986 | Japan . |
| 61-252256 | 11/1986 | Japan . |
| 63-33450 | 2/1988 | Japan . |
| 63-99253 | 4/1988 | Japan . |

*Primary Examiner*—Veronica P. Hoke
*Attorney, Agent, or Firm*—Woodard, Emhardt, Naughton, Moriarty & McNett

[57] ABSTRACT

A flame retarding additive composition, useful in thermoplastic polyolefins, is disclosed comprising a mixture of a halogenated bisphenol derivative and the copolymer of a halogenated vinyl aromatic grafted onto polyolefin. The preferred bisphenol derivative is tetrabromobisphenol A bis(dibromopropyl ether), and the preferred graft copolymer comprises bromostyrene grafted onto isotactic or syndiotactic polypropylene. Also disclosed are the flame retarded, thermoplastic polyolefins prepared using the foregoing additive compositions.

30 Claims, No Drawings

FLAME RETARDANT ADDITIVE COMPOSITION USEFUL WITH POLYOLEFINS

BACKGROUND OF THE INVENTION

1. Field of the Invention

This invention pertains to a novel flame retarding additive useful in polyolefin compositions, as well as the resulting flame retarded polyolefin compositions. The inventive flame retarding compositions are comprised of a mixture of two flame retardant additives, a halogenated bisphenol derivative, for example tetrabromobisphenol A bis(dibromopropyl ether), also referred to as "TBBPA-bis(DBP)", and the copolymer of a halogenated vinyl aromatic, for example bromostyrene, grafted onto certain polymers, such as polypropylene.

2. Description of the Prior Art

Polyolefins have desirable properties for a variety of applications. For example, polypropylene is a versatile light weight plastic characterized by low cost, an attractive glossy surface, and excellent solvent and stain resistance. Its attractive fundamental properties have spurred its adaptation to a long list of applications including films, fibers and molded articles. Its use as a fiber in home, commercial and institutional settings—as well as its role in molded parts for electrical applications—have brought about the need for improved flame resistance.

It is known that numerous bromine-based flame retarding agents can be added to polyolefins such as polypropylene to achieve desired ignition resistance. Examples of these additives are decabromodiphenyl oxide, hexabromocyclododecane, tetrabromobisphenol A, brominated polystyrene, bis(tribromophenoxy)ethane and the like. However, every one of the effective agents appears to impart one or more undesirable properties that result in compositions which are less attractive or acceptable than non-flame retardant Polypropylene. For example, most bromine-based flame retardants are fairly expensive and add signficantly to the cost of the propylene. Many bromine-based flame retardants are incompatible with polypropylene, and over time they exude to the surface, resulting in an oily or frosty appearance on molded parts. When spun into fibers, surface blooming flame retardants can be deposited onto textile handling equipment, building to the point that production must be stopped for cleaning.

Polypropylene is thermally stable at normal processing temperatures. However, the more efficient brominated flame retardants contain labile aliphatic halogen which tends to degrade under standard processing conditions, resulting in discoloration and corrosion. Also, most brominated flame retardants with sufficient thermal stability to withstand high temperature spinning conditions contain the more stable—but less efficient—aromatic bromine. Besides requiring higher loadings to compensate for lower efficiency, many of the thermally stable flame retardants have melting points above typical polypropylene spinning temperatures. Thus, while polypropylene is readily spun into fibers, this can cause abrasion and/or plugging of spinnerettes.

It is generally recognized in the industry that brominated flame retardants containing only aromatically bound bromine can lack efficiency in polyolefins, especially when the ignition source is a relatively cool flame. On the other hand, using flame retardants containing only the more loosely bound aliphatic bromine can result in decomposition during high temperature compounding. This will cause discoloration of the polymer and corrosion of the handling equipment.

TBBPA-bis(DBP) is an established commercial flame retardant known to be especially efficient in polypropylene. Numerous patents on its use exist, including U.S. Pat. No. 3,883,481 issued to Kopetz et al. on May 13, 1975, which describes a composition comprising a polyolefin, antimony oxide and a series of brominated phenoxy derivatives. TBBPA-bis(DBP), by itself, does have the fire retarding efficiency that was predicted and has acceptable thermal stability for many polypropylene applications. However, it is fairly expensive and also has a major fault that prevents even broader use. Like many other brominated flame retardants, it "blooms" or "bleeds" to the surface of polypropylene. This gives a frosty appearance to molded parts that is easily smeared, leaving an unattractive surface. In thin sections—and particularly in spun fibers—it may be possible to lose enough flame retardant to the surface that the fire retardancy is diminished.

The effectiveness of TBBPA-bis(DBP) has been so widely recognized that a significant amount of research has been done to find ways to eliminate its tendency to bloom. To date all of these attempts have centered on the addition of compatibilizers to retard the migration of TBBPA-bis(DBP) to the surface. However, deficiencies in these systems have persisted, and there has remained a desire for polyolefin compositions which include TBBPA-bis(DBP) and which have improved flame retarding efficiency but which show reduced or no bloom or bleed.

SUMMARY OF THE INVENTION

Briefly describing one aspect of the Present invention, there is provided a flame retardant additive composition, useful in thermoplastic polyolefins, comprising a mixture of a halogenated bisphenol derivative and a ring halogenated vinyl aromatic grafted onto certain polymers, such as polyolefin. The halogenated bisphenol derivative, also referred to herein as TBBPA-bis(DBP), has the formula (I):

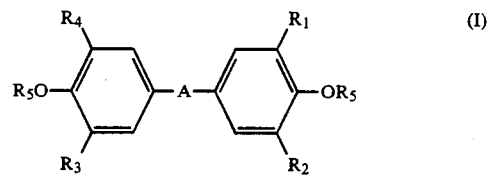

in which $R_1$ to $R_4 =$ H, $CH_3$ or halogen; $R_5 =$ H, dihaloethyl, dihalopropyl or dihalobutyl; and A = single bond, O, CO, S, $SO_2$ or $C(R_6)(R_7)$, where $R_6$ and $R_7 =$ H or $C_{1-4}$ alkyl. Also provided are flame retarded thermoplastic polyolefin compositions including an effective amount of the foregoing flame retardant additive mixture.

It is an object of the present invention to provide synergistic flame retardant additive mixtures which, when added to thermoplastic polyolefins, are highly effective flame retarding agents and which will show little or no bloom or bleed to the surface of fabricated articles, fibers or films over time.

Another object of the present invention is to provide a flame retardant additive mixture which is readily fabricated in a convenient, non-dusting pelletized form.

It is a further object of the present invention to provide flame retarded polyolefins which display minimal or no bloom or bleed of the incorporated flame retarding agents.

Further objects and advantages will be apparent from the description of the preferred embodiment which follows.

DESCRIPTION OF THE PREFERRED EMBODIMENT

For the purposes of promoting an understanding of the Principles of the invention, reference will now be made to the preferred embodiment of the invention and specific language will be used to describe the same. It will nevertheless be understood that no limitation of the scope of the invention is thereby intended, such alterations, modifications and further applications of the principles of the invention being contemplated as would normally occur to one skilled in the art to which the invention relates.

The flame retardant composition of our invention includes a mixture of two types of flame retardant additives. The mixture comprises (a) a halogenated bisphenol derivative and (b) a grafted polyolefin. The mixtures are useful as flame retardant additives, and surprisingly the components thereof show reduced bleed or bloom to the surface.

The first component of our invention mixture is a halogenated bisphenol derivative having the general structure (I):

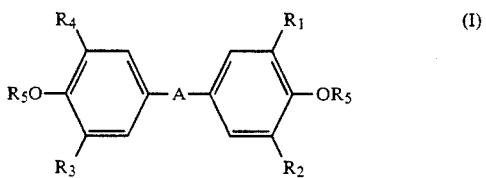

in which $R_1$ to $R_4$ = H, $CH_3$ or halogen; $R_5$ = H, dihaloethyl, dihalopropyl or dihalobutyl; and A = single bond, O, CO, S, $SO_2$ or C( ($R_7$), where $R_6$ or $R_7$ = H or $C_{1-4}$ alkyl.

A preferred class of compounds is represented by:

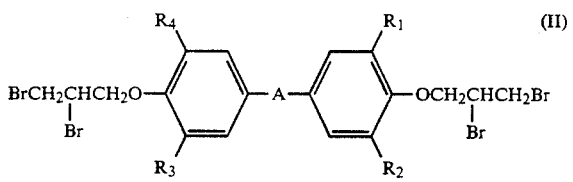

in which $R_1$ to $R_4$ and A are as previous defined. A more preferred class is represented by (II) above, but where $R_1$ to $R_4$ = Br. The most preferred compound is TBBPA-bis(DBP).

Bisphenols that are especially useful in the preparation of compounds of our invention are those which can be easily synthesized from phenol and ketones. Examples of these bisphenols are 2,2-bis(4-hydroxyphenyl)butane; 3,3-bis(4-hydroxyphenyl)hexane and the like. The most preferred is 2,2-bis(4-hydroxyphenyl)propane. The hydroxyphenyl portion of the molecule may be halogenated or contain methyl groups. The most preferred is 2,6-dibromophenol, which is best obtained by bromination after synthesis of the bisphenol.

Alternative bisphenols are those in which the hydroxyphenyl groups are directly connected (biphenyls), connected by oxygen (diphenyl ethers), by carbonyl (ketones), by sulfur (thioethers), and by $SO_2$ (sulfonates).

Ethers of the bisphenols are conveniently prepared using the Williamson synthesis. Typically, the bisphenol is converted to the sodium phenoxide and is then contacted with an unsaturated alkyl halide at a temperature sufficient to complete ether formation. The unsaturated portion of the ether is then combined with elemental halogen using conditions well known in the art. Suitable unsaturated alkyl halides include 1 bromo-2-butene, 1-chloro-2-butene, 1-chloro-3-methylbutene, 3-chlorocyclopentene and the like. The preferred alkyl halide is allyl chloride or bromide.

The second component is a copolymer of ring halogenated polystyrene grafted onto a polyolefin. The base polyolefin may include, for example, polymers and copolymers of propylene ethylene, 1-butene, hexene, 4-methyl-1-pentene, octene and vinyl acetate, and combinations thereof. The polyolefin may be Prepared by various conventional techniques such as follows. By way of example, crystalline polypropylene homopolymer (isotactic or syndiotactic) may be used as the base for the graft copolymer. Polymers with melt indices of 0.1 to 200 g/10 minutes may be preferably employed (as measured by ASTM D-1238). The preferred range of melt index is from 1 to 50 g/10 minutes. A suitable graft base, for example, has been determined to be resin 10-5219 (melt index=20) from Amoco Chemical Co.

The preferred ring halogenated vinyl aromatic may contain bromine or chlorine, or mixtures of bromine and chlorine, and may also be ring substituted with one or more aliphatic groups such as methyl, ethyl, propyl isomers, t-butyl and the like. More preferred is a brominated styrene, which may contain from 1 to 4 bromine atoms per ring, or mixtures of degrees of bromination from 1 to 4, particularly so that the overall composition contains a high percentage of bromine while remaining in liquid form at room temperature. (Pure tri-, tetra- and pentabromostyrene are solids.) The most preferred monomer is dibromostyrene. As produced by Great Lakes Chemical Corporation, the dibromostyrene normally contains about 15% monobromostyrene and 3% tribromostyrene by weight.

The graft copolymer is represented by the formula:

in which n is an integer >1; P is a polyolefin; and S is a ring brominated vinyl aromatic side chain grafted to the polyolefin The side chain preferably comprises monomeric units of the formula:

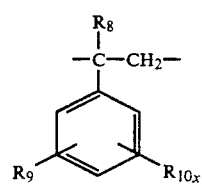

in which x = 1 to 4; $R_8$ = H or $CH_3$; $R_9$ = H or $C_{1-4}$ alkyl; $R_{10}$ = Br or Cl. The graft copolymer may also include homopolymers of the ring halogenated monomer as well as non-grafted polyolefin.

The halogenated monomer may also contain various storage stabilizers such as phenols or compounds of sulfur, nitrogen and phosphorus known to the industry to inhibit premature polymerization.

The halogenated monomer is grafted to the polyolefin using known methods including irradiation, peroxidation by exposure to oxygen at elevated temperatures, and abstraction of protons by free radical initiators. The graft polymerization may be performed using solution, suspension, emulsion or bulk procedures. The preferred method uses a free radical initiator such as dicumylperoxide, benzoylperoxide, t-butylperbenzoate, 2,2'-azobis(isobutyronitrile), cumenehydroperoxide or the like dissolved in the halogenated monomer at levels from 0.1% to 5% on weight of the monomer, preferably from 1% to 3%. The solution is added to agitated molten polyolefin. The grafting is best carried out in a kneading type mixer such as a Banbury, in an extruder, or on a two roll mill.

The quantity of monomer added is such that an amount of bromine is present in the grafted composition to make it particularly useful as a flame retarding agent, normally from 1% to 20% bromine, with 3% to 15% bromine being preferred. Alternatively, an excess of halogenated monomer may be added to produce a concentrate with levels of 10% to 60% bromine, preferably 30% to 50%, which may be let down with ungrafted polyolefin to obtain the final composition. The advantage in the latter approach is the maximization of physical strength properties by the introduction of polyolefin into the composition which has not been exposed to the harsh conditions of the grafting process.

Graft polymerization will typically result in the production of both grafted polyolefin and ungrafted homopolymer of the halogenated monomer. It has been found that the grafted polyolefin and any homopolymer present will remain well intermixed, even during processing. The homopolymer could alternatively be removed, but this is not necessary. The preferred composition therefore includes both grafted polyolefin and halogenated homopolymer. In addition, the composition may also include ungrafted polyolefin.

Chain transfer agents may also be dissolved into the monomer prior to grafting in order to control the molecular weight of the halogenated polymer. Alkyl halides and mercaptans are particularly useful, with 1-dodecanethiol being preferred. Loadings from 0.1% to 5% on weight of the monomer may be used with 0.5% to 3% being typical.

During the grafting process a minor amount of other reactive unsaturated comonomers can be mixed into the halogenated styrene for the purpose of additional property modification. Examples of modifications that might be desirable include changes in color, clarity, lubricity, dyability, melt viscosity, softening point, thermal stability, ultraviolet stability, viscoelastic behavior, polarity, biodegradability, static charge dissipation, strength and stiffness. Examples of potential reactive comonomers are maleic anhydride, styrene, chloromethylstyrene, acrylonitrile, methylmethacrylate, acrylic acid, butene, butadiene and acrylamide.

Further property modification of the composition may be accomplished by the inclusion of nonreactive additives. These may include antioxidants, ultraviolet absorbers, antistatic agents, pigments, dyes, nucleating agents, fillers, slip agents, lubricants, antiblocking agents, plasticizers, and antimicrobials. The additives may be incorporated into the composition prior to grafting, during the grafting process, or as a separate compounding step following the graft polymerization, the last of which having the advantage of avoiding the possibility of harmful interaction between any of the property modifying additives and the chemistry of the grafting process.

The grafting is carried out at temperatures sufficiently hot enough to reduce viscosity of the molten polyolefin, ensure thorough mixing during and after monomer addition, and promote decomposition of the initiator with the resulting rapid polymerization of the monomer. For example, when polypropylene is used then temperatures from 120° C. to 230° C. may be used depending on the molecular weight and crystallinity of the polypropylene, with ranges from 170° C. to 200° C. being preferred.

The grafting proceeds readily at atmospheric pressure; the elevated pressures encountered in plastics processing equipment may also be used. Following polymerization, a vacuum may be applied to reduce the amount of unreacted monomer.

The time necessary for the graft polymerization will depend on the temperature, choice of initiator and efficiency of mixing. Ranges from 1 second to several hours may be used, but in the interest of efficiency a typical polymerization time of 10 to 300 seconds is employed.

The halogenated bisphenol component and the halostyrene graft component are compounded into thermoplastic polyolefins using methods well known in the industry. These may employ the use of Banbury type mixers, extruders, two roll mills, or other common plastics compounding equipment. The components may be added as individual ingredients, or alternatively the two flame retardants may be precombined to provide a single convenient package. It is an advantage of our invention that the precombined package can be produced in the form of easily conveyed, metered, and compounded non-dusting plastic pellets. This is a significant benefit to those incorporating the flame retardants since the most preferred bisphenol is a low-melting dusty powder. In addition, the bisphenol is difficult to mix into plastics because of its low melt viscosity. The precombined package circumvents these problems.

The two components are used at ratios selected to provide low or no bloom of the bisphenol, and at a total loading to provide the desired level of flame retardancy. Weight ratios of bisphenol to graft copolymer may range from 99:1 to 1:99. A more preferred ratio range is from 50:50 to 1:99. The most preferred ratio is 15:85. The components may be added to polyolefins at levels to provide an overall concentration of from 0.1% to 25% halogen based on the weight of the entire composition More preferred loadings are from 0.5% to 15% halogen. The most preferred loadings result in 1% to 10% halogen in the final composition.

In addition to the halogenated components of our invention, supplemental flame retardants may be utilized. Examples of these materials - sometimes referred to as synergists - include $Sb_2O_3$, $Sb_3O_5$, $Bi_2O_3$, $MoO_3$, $NH_4NO_3$, trityl compounds, 2,3-dimethyl-2,3-diphenylbutane, peroxides, and various phosphorus containing materials. These may be added during the final compounding step or may be included in the precombined package of the halogenated components.

The flame retardant mixture of our invention may be blended —along with any desired stabilizers, modifiers, synergists or the like—into a wide range of thermoplastic polyolefins. For example, the thermoplastic polymers include polypropylene, polyethylene, polybutylene and polystyrene. The more preferred polyolefins include copolymers containing at least 50% by weight of copolymerized propylene monomer. Examples of other suitable monomers are ethylene, butene, 2-methyl-propene-1 and the like. Mixtures of the above polymers may also be utilized. The most preferred polyolefin is polypropylene.

The invention will be further described with reference to the following specific Examples. It will be understood that these Examples are illustrative and not restrictive in nature. In the following Examples, percents indicated are percents by weight unless indicated otherwise.

HI-30 RS, Newbury Industries, Inc., Newbury, OH). Molding conditions are shown in Table 1:

TABLE 1

| CONDITIONS FOR INJECTION MOLDING | |
|---|---|
| Injection Pressure, psi | 500 |
| Cycle Time, sec | 30 |
| Rear Temperature, °F. | 410 |
| Front Temperature, °F. | 410 |
| Mold Temperature, °F. | 75 |
| Screw Speed, rpm | 200 |
| Injection Time, sec | 10 |

The injection molded specimens were tested for flame retardancy and tendency to bloom. The results are shown in Table 2:

TABLE 2

EFFECT OF BLEND RATIOS ON FLAME RETARDANCY AND BLOOM

| Example Number | Wt. Ratio PP-g-BS: TBBPA-bis(DBP) | Br From PP-g-BS, % | Br From TBBPA-bis(DBP), % | Total Br, % | UL-94 Rating[1] | Bloom?[2] |
|---|---|---|---|---|---|---|
| 3 | 100:0 | 3.00 | 0.00 | 3.00 | Fail | No |
| 4 | 91:9 | 2.48 | 0.48 | 2.96 | V-2 | No |
| 5 | 85:15 | 2.23 | 0.75 | 2.98 | V-2 | No |
| 6 | 50:50 | 0.72 | 1.36 | 2.08 | V-2 | Yes |
| 7 | 0:100 | 0.00 | 0.75 | 0.75 | Fail | Yes |

[1]Underwriters Laboratories - Test For Flammability of Plastic Materials - Standard UL-94. Tested at ⅛ inch thickness.
[2]After 168 hours at 50° C. molded specimens were tested for bloom by wiping a portion of the surface and comparing with unwiped areas.

EXAMPLE 1

A concentrate of dibromostyrene grafted to polypropylene was prepared as follows: 2.1 g of dicumylperoxide were dissolved into 210 g of Great Lakes Dibromostyrene. In a batch process, the monomer plus peroxide solution was added to 138 g of molten polypropylene homopolymer (Amoco 10-5219) in a Brabender Prep Center mixer. Bowl temperature was maintained at 180° C. while mixing at 50 rpm's as the monomer was being added over a 10 minute period. Following the addition of the last of the monomer, the mixture was held an additional 5 minutes at 180° C. The product (PP-g-BS) was emptied from the bowl, cooled to room temperature and granulated. The graft concentrate contained a calculated 36% bromine.

EXAMPLE 2

A 90:10 weight ratio blend of PP-g-BS and TBBPA-bis(DBP) was prepared as follows. 4,500 g of PP-g-BS prepared as described in Example 1 were dry blended with 500 g of TBBPA-bis(DBP) (PE-68 from Great Lakes Chemical Corp.). The mixture was fed into a Brabender Prep Center single screw extruder (L/d =25/1, all zones at 180° C., die=200°, 60 rpm's). The molten blend was stranded, cooled in a water bath and pelletized to obtain off-white, non-dusting plastic pellets with a calculated bromine content of 39.2%.

EXAMPLES 3-7

A series of PP-g-BS : TBBPA-bis(DBP) ratios were blended into polypropylene to determine the extent of surface bloom and to compare flame retarding efficiencies. The flame retardants were dry blended with Amoco 10-6352 polypropylene homopolymer, black color concentrate (to make surface bloom easier to determine), and antimony trioxide to provide 1% $Sb_2O_3$ in the final composition. The blends were compounded in a Brabender Prep Center mixer at 180° C. and 50 rpm's, cooled, granulated, and injection molded using a Newbury Injection Molding Machine (Model Example 3 demonstrates that PP-g-BS at a 3% bromine loading does not show any surface bloom, but does not meet the requirements for any of the UL-94 ratings. Example 4 shows that if a small amount of bromine from Example 3 is substituted with bromine from TBBPA-bis(DBP), a UL-94 V-2 rating is obtained without causing surface bloom. In Example 5, the portion of bromine from TBBPA-bis(DBP) is further increased without causing bloom. However, in Example 6 most of the bromine is provided by TBBPA-bis(DBP). Excellent flame retarding efficiency is demonstrated (a V-2 rating is maintained at lower total bromine), but bloom is observed. Finally, in Example 7, TBBPA-bis(DBP) as the only flame retardant is loaded at the same concentration as in Example 5. The result is a loss of flame retardancy and the generation of bloom. Only at the ratios in Examples 4 and 5 were V-2 ratings maintained without causing surface bloom.

EXAMPLES 8 AND 9

A PP-g-BS/TBBPA-bis(DBP) blend was compared with PP-g-BS by itself as a flame retardant for melt spun polypropylene. The additives were dry blended into Amoco 10-6352 polypropylene homopolymer, then melt spun on a pilot scale fiber spinning line from Hills, Inc. A melt temperature of 270° C. was maintained with a draw ratio of 3:1. Fibers of 15 dpf were produced with a yarn denier of 1,080. In order to test flame retardancy, the yarns were knitted into 9.1 oz/sq.yd. fabrics using a Brother Model KH-836 knitting machine. Efficiency of the flame retardants was compared using the NFPA-701 vertical burn test. Results are shown in Table 3.

TABLE 3

| COMPARISON OF BLEND EFFICIENCY IN KNITTED FABRICS | | |
|---|---|---|
| Example Number | 8 | 9 |
| Flame Retardant Used | PP-g-BS (Example 1) | 90:10 Blend (Example 2) |
| Amount of Flame Retardant, g | 757 | 697 |
| Amount of Polypropylene, g | 8323 | 8383 |

| TABLE 3-continued | | |
|---|---|---|
| COMPARISON OF BLEND EFFICIENCY IN KNITTED FABRICS | | |
| Example Number | 8 | 9 |
| Calculated Br in Fiber, % | 3.0 | 3.0 |
| Average Burn Time, sec.[1] | 45 | 0 |
| Average Burn Length, in.[2] | 6.4 | 3.4 |
| Flaming Drips?[3] | Yes | No |

[1] Average time for the specimen to self-extinguish following the 12 second ignition.
[2] Burn length was measured from the bottom of the specimen holder to the highest point of fabric melt.
[3] If molten polymer continued to burn on the test chamber floor, the sample was considered to have flaming drips.

These results dramatically demonstrate that the flame retarding efficiency of a 90:10 blend of PP-g-BS : TBBPA-bis(DBP) is much greater than that of PP-g-BS on an equal bromine basis. The data in Table 2 already have shown that the blends have excellent efficiency in molded articles (without surface bloom); the results in Table 3 show that the improvement extends into the fiber area.

EXAMPLE 10

The preparation of Example 1 is repeated to produce polypropylenes grated with dibromostyrene to have percentages of bromine, based on the overall compound, of 1, 3, 10, 15, 20, 30, 50 and 60 weight percent. Suitable graft polymers useful in combination with the bisphenol derivatives of the present invention are produced. The foregoing preparations are repeated with different halogenated monomers, including monomers including 1, 2, 3 and 4 bromines per unit, and suitable products are obtained.

The various halogenated monomers above described are combined with different polyolefins. The polyolefins include polymers and copolymers of propylene, ethylene, 1-butene, hexene, 4-methyl-1-pentene, octene, vinyl acetate and mixtures thereof. Useful flame retardant additives suited for use with the bisphenol derivatives of the present invention result.

EXAMPLE 11

Mixtures of graft copolymer compositions, as previously described, are made with halogenated bisphenol derivatives. The bisphenol derivatives have the formula:

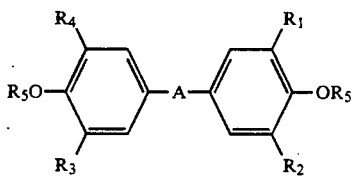

in which $R_1$ to $R_4$=H, $CH_3$ or halogen; $R_5$=H, dihaloethyl, dihalopropyl or dihalobutyl; and A=a single bond, O, CO, S, $SO_2$ or $C(R_6)(R_7)$, wherein $R_6$ and $R_7$= H or $C_{1-4}$ alkyl. The bisphenol derivatives further specifically include those having the formula:

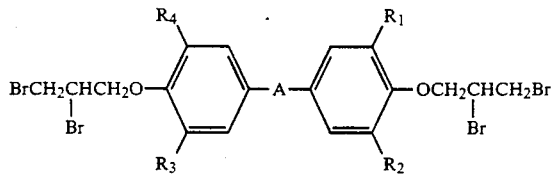

in which $R_1$ to $R_4$ and A are as previous defined. Mixtures of the foregoing bisphenol derivatives and graft copolymer compositions yield flame retardant additive compositions useful with a variety of thermoplastic polyolefins. The ratios of the bisphenol derivative to the graft copolymer include 99:1, 15:85, 50:50 and 1:99, and yield desirable flame retardant additives.

EXAMPLE 12

Upon addition of the foreoing flame retardant additives of Example 11 to thermoplastic polyolefins, namely polypropylene, polyethylene, polybutylene and polystyrene, flame retardant polyolefins are obtained. The mixtures of the flame retardant additives and thermoplastic polyolefins are made at bromine levels (based on weight percent of the overall composition) of 0.1, 0.5, 1, 10, 15 and 25%, and improved flame retardancy for the thermoplastic polyolefins, over the non-additive containing thermoplastic polyolefins, is achieved.

While the invention has been illustrated and described in detail in the foregoing description, the same is to be considered as illustrative and not restrictive in character, it being understood that only the preferred embodiment has been shown and described and that all changes and modifications that come within the spirit of the invention are desired to be protected.

What is claimed is:

1. A flame retardant additive composition, useful in thermoplastic polyolefins, comprising a mixture of:

a halogenated bisphenol derivative represented by the formula:

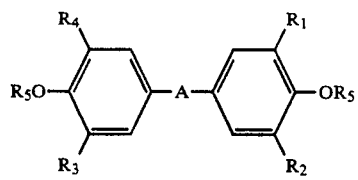

in which $R_1$ to $R_4$=H, $CH_3$ or halogen; $R_5$=H, dihaloethyl, dihalopropyl or dihalobutyl; and A=a single bond, O, CO, S, $SO_2$ or $C(R_6)$ $(R_7)$, wherein $R_6$ and $R_7$= H or $C_{1-4}$ alkyl; and a graft copolymer composition represented by the formula:

wherein n is >1, P is polyolefin, and S is a grafted side chain having halogenated monomeric units of the formula:

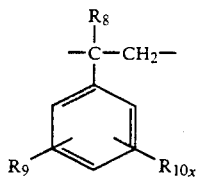

wherein x=1 to 4, R$_8$ is H or CH$_3$, R$_9$ is H or a C$_{1-4}$ alkyl group, and R$_{10}$ is Br or Cl, said graft copolymer including at least about 1% bromine by weight of graft polymer.

2. The composition of claim 1 in which R10 is Br.
3. The composition of claim 2 in which said graft copolymer comprises about 1% to about 60% by weight bromine.
4. The composition of claim 3 in which said graft copolymer comprises about 1% to about 20% by weight bromine.
5. The composition of claim 4 in which said graft copolymer comprises about 3% to about 15% by weight bromine.
6. The composition of claim 3 in which said graft copolymer comprises about 10% to about 60% by weight bromine.
7. The composition of claim 6 in which said graft copolymer comprises about 30% to about 50% by weight bromine.
8. The composition of claim 1 in which said bisphenol derivative has the formula:

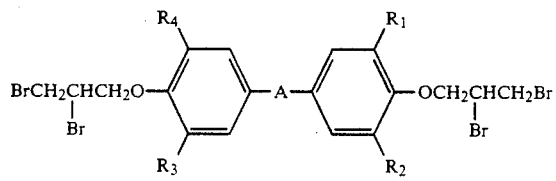

in which R$_1$ to R$_4$ and A are as previous defined.

9. The composition of claim 8 in which R$_1$ to R$_4$=Br.
10. The composition of claim 9 in which

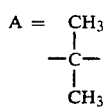

11. The composition of claim 1 in which the ratio of said bisphenol derivative to said graft copolymer is from 99:1 to 1:99.
12. The composition of claim 11 in which the ratio is from 50 to 1:99.
13. The composition of claim 12 in which the ratio is about 15:85.
14. The composition of claim 1 in which the polyolefin is selected from the group consisting of polymers and copolymers of propylene, ethylene, 1-butene, hexene, 4-methyl-1-pentene, octene, vinyl acetate and mixtures thereof.
15. A fame retardant, thermoplastic polyolefin composition comprising:
   (a) a thermoplastic polyolefin; and
   (b) an effective amount of a flame retardant additive composition comprising a mixture of:

(i) a halogenated bisphenol derivative represented by the formula:

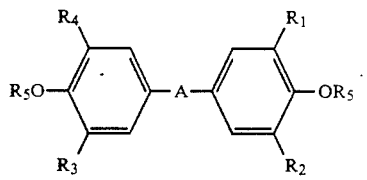

in which R$_1$ to R$_4$=H, CH$_3$ or halogen; R$_5$=H, dihaloethyl, dihalopropyl or dihalobutyl; and A=a single bond, O, CO, S, SO$_2$ or C(R$_6$)(R$_7$), wherein R$_6$ and R$_7$=H or C$_{1-4}$ alkyl, and (ii) a graft copolymer composition represented by the formula:

$$\overset{P}{\underset{(S)_n}{|}}$$

wherein n is >1, P is polyolefin, and S is a grafted side chain having halogenated monomeric units of the formula:

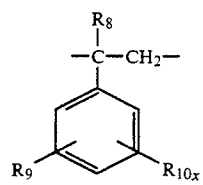

wherein x=1 to 4, R$_8$ is H or CH$_3$, R$_9$ is H or a C$_{1-4}$ alkyl group, and R$_{10}$ is Br or Cl, said graft copolymer including at least about 1% bromine by weight of graft copolymer.

16. The thermoplastic polyolefin composition of claim 15 in which R$_{10}$ is Br.
17. The thermoplastic polyolefin composition of claim 16 in which said graft copolymer comprises about 1% to about 60% by weight bromine.
18. The thermoplastic polyolefin composition of claim 17 in which said graft copolymer comprises about 3% to about 15% by weight bromine.
19. The thermoplastic polyolefin composition of claim 17 in which said graft copolymer comprises about 30% to about 50% by weight bromine.
20. The thermoplastic polyolefin composition of claim 15 in which said bisphenol derivative has the formula:

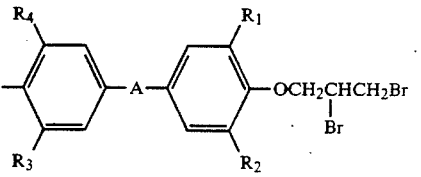

in which R$_1$ to R$_4$ and A are as previous defined.

21. The thermoplastic polyolefin composition of claim 20 in which R$_1$ to R$_4$=Br.
22. The thermoplastic polyolefin composition of claim 21 in which

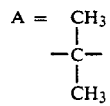

23. The thermoplastic polyolefin composition of claim 15 in which the ratio of said bisphenol derivative to said graft copolymer is from 99:1 to 1:99.

24. The thermoplastic polyolefin composition of claim 23 in which the ratio is from 50:50 to 1:99.

25. The thermoplastic polyolefin composition of claim 24 in which the ratio is about 15:85.

26. The thermoplastic polyolefin composition of claim 15 and which comprises 0.1% to 25% by weight halogen.

27. The thermoplastic polyolefin composition of claim 26 and which comprises 0.5% to 15% by weight halogen.

28. The thermoplastic polyolefin composition of claim 27 and which comprises 1% to 10% by weight halogen.

29. The thermoplastic composition of claim 15 in which P is selected from the group consisting of polymers and copolymers of propylene, ethylene, 1-butene, hexene, 4-methyl-1-pentene, octene, vinyl acetate and mixtures thereof.

30. The thermoplastic composition of claim 15 in which the thermoplastic polyolefin is selected from the group consisting of polypropylene, polyethylene, polybutylene and polystyrene.

* * * * *

UNITED STATES PATENT AND TRADEMARK OFFICE
CERTIFICATE OF CORRECTION

PATENT NO. : 5,216,059
DATED : June 1, 1993
INVENTOR(S) : Ray W. Atwell, et al.

It is certified that error appears in the above-identified patent and that said Letters Patent is hereby corrected as shown below:

In Column 1, line 38, change "Polypropylene" to --polypropylene--.

In Column 2, line 35, change "Present" to --present--.

In Column 3, line 11, change "Principles" to --principles--.

In Column 3, line 41, change "C( $(R_7)$" to --$C(R_6)(R_7)$--.

In Column 4, line 20, change "Prepared" to --prepared--.

In Column 6, line 4, change "Possibility" to --possibility--.

In Column 11, line 55, change "50" to --50:50--.

Signed and Sealed this

Eighteenth Day of January, 1994

Attest:

BRUCE LEHMAN

Attesting Officer

Commissioner of Patents and Trademarks